(12) United States Patent
Mathews

(10) Patent No.: US 6,761,413 B1
(45) Date of Patent: Jul. 13, 2004

(54) TIP TRAILER

(76) Inventor: Mark Mathews, P.O. Box 1529, Dubbo New South Wales (AU), 2830

( * ) Notice: Subject to any disclaimer, the term of this patent is extended or adjusted under 35 U.S.C. 154(b) by 0 days.

(21) Appl. No.: 09/979,222

(22) PCT Filed: May 16, 2000

(86) PCT No.: PCT/AU00/00478

§ 371 (c)(1),
(2), (4) Date: Mar. 14, 2002

(87) PCT Pub. No.: WO00/69676

PCT Pub. Date: Nov. 23, 2000

(30) Foreign Application Priority Data

May 18, 1999 (AU) .............................................. PQ0397
Sep. 17, 1999 (AU) ............................................ PQ02931

(51) Int. Cl.⁷ ................................................. B60P 1/00
(52) U.S. Cl. ............... 298/18; 298/23 MD; 298/22 AE; 298/22 P
(58) Field of Search ....................... 298/23 MD, 23 S, 298/13, 17.7, 18, 22 AE, 22 P, 22 J

(56) References Cited

U.S. PATENT DOCUMENTS

| | | | |
|---|---|---|---|
| 2,072,998 A | * | 3/1937 | Allen |
| 2,286,416 A | * | 6/1942 | Halstro |
| 2,694,599 A | | 11/1954 | Porter et al. .............. 298/19 m |
| 2,859,709 A | | 11/1958 | Flowers |
| 3,041,111 A | * | 6/1962 | Wyrick, Jr. |
| 3,055,710 A | | 9/1962 | Black ........................ 298/17.5 |
| 3,083,058 A | * | 3/1963 | Walstrom et al. |
| 3,238,897 A | * | 3/1966 | Flowers |
| 3,306,654 A | | 2/1967 | Curcio |
| 3,884,526 A | * | 5/1975 | Sweet et al. ................ 298/1 A |
| 3,937,502 A | * | 2/1976 | Gay ............................ 298/11 |
| 4,030,171 A | | 6/1977 | Arguin |
| 4,327,945 A | * | 5/1982 | Fowler ........................ 298/11 |
| 4,733,451 A | * | 3/1988 | Voigt |
| 4,883,321 A | | 11/1989 | Voigt .......................... 298/17.7 |
| 5,509,724 A | * | 4/1996 | Perry et al. ............... 298/22 D |
| 5,758,927 A | * | 6/1998 | Koester .................. 298/22 AE |
| 5,845,971 A | | 12/1998 | Rogers ........................ 298/18 |
| 5,957,538 A | | 9/1999 | Sullivan .................... 298/17.5 |
| 6,113,194 A | * | 9/2000 | Neufeld ..................... 298/17.7 |
| 6,520,589 B2 | * | 2/2003 | Jensen et al. .............. 298/17.7 |

* cited by examiner

Primary Examiner—Stephen Gordon
(74) Attorney, Agent, or Firm—Klein, O'Neill & Singh, LLP

(57) ABSTRACT

A tip trailer (10) includes a bin (11) having a floor (12), a front wall (13), side walls, a plurality of struts extending from the floor (12) to substantially an upper extremity of the side walls, one or more rear axles (16) and wheels (17), and one or more hydraulic rams (18, 28) operable to tip the bin (11), wherein overhead beams (19) are located substantially along a length of the bin (11), and the floor (12) is suspended from the overhead beams (19).

17 Claims, 8 Drawing Sheets

TIP TRAILER

TECHNICAL FIELD

The present invention relates to tip trailers, and in particular provides a low profile and lightweight tip trailer.

BACKGROUND ART

Tip trailers are regularly used in a wide range of applications, primarily in the earthmoving industry. For example, tip trailers may be used for transporting materials in civil contracting works such as construction or road works, or may be used to remove workings from a mine, or to deliver soil to private individuals such as landholders or farmers.

Conventional tip trailers usually lift a front end of a bin to cause a load to slide out a back of the truck, or, in the case of a 'side tipper', a side of the bin is lifted to cause the load to slide out an opposite side of the bin. Conventional tip trailers are usually of one of the following two types: "chassis tipper" or "tip-over-axle". A chassis tipper is characterised by a chassis mounted on front and Year axles, the bin being mounted on the chassis such that when tipped, a front end of the bin rises, above the chassis and axles. A tip-over-axle style tip trailer is characterised in that the bin is mounted to the chassis and the axles such that when tipped, the chassis and even the front axle lift along with the bin, the tipping motion being about the rear axle.

Furthermore, in designing the bin of tip trailers, a number of limiting factors come into play. For example, the maximum width of the bin is often dictated by the width of public roads. In conventional tip trailers the useable width of the bin is further limited by vertical support members, usually of square cross sectional shape, which are located on the outside of the bin on either side of the bin. The vertical support members are required in order to provide sufficient robustness and rigidity to the skin of the bin so as to withstand the outward forces exerted when the bin is loaded. However the useable width of the bin is reduced by the transverse dimension of the vertical support members on either side.

Additionally, the maximum height of the bin can not be greater than the clearances of bridges and the like on public roads, and the height of the bin is preferably as small as possible so as to ease the loading of materials into the bin, for example by a loader, and to increase the stability of the tip trailer. However, conventional bin designs are hampered in this regard by the need for elements between the wheels and the floor of the bin. These elements include a chassis, suspension, hydraulic ram(s) and a turnplate. In particular, the turnplate must be sufficiently strong to withstand the forces created between the prime mover and the trailer during use, for example by acceleration and cornering, and therefore is typically quite bulky. The chassis typically includes a number of heavy beams extending along the length of the bin, which provide the primary structural strength of the tip trailer and support the bin. The presence of these elements causes the floor of the bin to be elevated above the top of the wheels. In known tip trailers the floor of the bin is usually higher than desirable above the top of the wheels.

Also, the length of the bin is preferably minimised in order to provide a short wheel base to increase stability of the bin both during travel and when tipping.

However, reducing the dimensions of the bin limits the volume of the bin. In order to move a given amount of material in the least number of loads it is desirable to load the bin as close as possible to the legal weight limit. However, where the material to be carried is not dense, the limited volume of the bin often results in a full load weighing significantly less than the legal weight limit, and so a larger number of loads are required, increasing the time and cost of transporting the material.

A further limitation placed on the design of tip trailers results from the conflicting requirements of (a) robustness and strength in the bin and (b) reducing the weight of the bin as much as possible. In order to provide sufficient strength and durability, practically all conventional tip trailers are heavier than is desirable. However, this increases fuel consumption and, due to the legal weight limit, reduces the weight of a load which may be carried.

DISCLOSURE OF INVENTION

According to a first aspect, the present invention provides a tip trailer including:

a bin having a floor, a front wall, side walls and a plurality of struts extending from the floor to substantially an upper extremity of the side walls;

one or more rear axles and wheels; and tipping means operable to tip the bin;

wherein overhead beams for bearing the bin and a load of the bin are located substantially at an upper extremity of each side wall and extend substantially along a length of the bin, and wherein the floor is suspended from the overhead beams.

The floor may be suspended from the overhead beams by the struts and/or the walls.

The overhead beams are preferably supported by rear struts located proximate the rear axles, and by the front wall or struts proximate the front wall. Alternatively, the overhead beams may be supported at a front of the bin by the tipping means. The weight of the overhead beams is preferably transferred to the rear axles and to a turnplate.

The overhead beams provided in the present invention may act to support some or all of a load in the bin, permitting the absence of a chassis located beneath the floor of the bin, or alternatively permitting a significant reduction in size, weight, strength and load bearing ability of a chassis. The reduced size or absence of a chassis enables the floor of the bin to be situated significantly closer to the wheels than in prior art tip trailers, providing a low centre of gravity and improved stability.

The overhead beams are preferably located at an upper extremity of the side walls.

The tipping means may be operable to lift a front end of the bin, or alternatively, in 'side tipper' embodiments of the invention, to lift a side of the bin. The tipping means is preferably provided by one or more hydraulic rams.

Embodiments of the invention may further include large transverse trusses located under the floor between the front and rear axles. The transverse trusses are preferably configured to transfer a downward force exerted by a load in the bin to outer edges of the bin. As such transverse trusses are located between the front and rear axles, they may extend significantly below a height of the top of the wheels.

The tip trailer of the present invention permits the reduction in size or removal altogether of a chassis under the floor of the bin.

Preferred embodiments of the invention further include a low profile turnplate and a low profile drawbar. In particularly preferred embodiments, the low profile drawbar is hingedly connected at a front extremity to a tumplate-hitch and hingedly connected at a rear extremity of the drawbar to the bin.

The low profile drawbar should be of sufficient length relative to a tip height of the bin to permit tipping of the bin. The low profile drawbar may be hingedly connected to the turnplate-hitch and to the bin by known pin and sleeve arrangements.

The low profile drawbar is preferably effected by primary beams passing along an outer edge of the floor, and preferably situated at least partially above a height of the floor. This arrangement may be assisted by the side walls of the bin being angled such that, close to the floor, the side walls extend inwardly to meet the floor a distance from the edge of the bin. In such embodiments the floor is not as wide as the bin, but is of sufficient width to meet the angled portion of the sidewalls, thereby forming a longitudinally mitred corner where the floor and the sidewall meet. The low profile drawbar may then be adapted to fit around the mitred corner, and even to extend above the mitre, outside the bin wall. This reduces the portion of the low profile drawbar situated below a height of the floor, permitting the bin to be mounted such that the floor of the bin is located close to the top of the wheels.

The low profile drawbar preferably includes a number of secondary braces situated below the floor and extending between the primary beams. The secondary braces are preferably configured so as to provide stability and rigidity to the low profile drawbar. The secondary braces preferably have a small vertical dimension to permit the floor of the bin to be mounted close to the top of the wheels.

The turnplate-hitch is preferably of low profile, that is, having a small vertical dimension to permit the mounting of the bin such that the floor of the bin is close to the top of the wheels. The turnplate-hitch acts to transfer force between the turnplate and the low profile drawbar. Preferably, the turnplate-hitch transfers force between the turnplate and primary beams of the low profile drawbar.

According to a second aspect, the present invention provides a tip trailer including:
  a bin having a floor, a front wall, side walls and a plurality of struts extending from the floor to substantially an upper extremity of the side walls;
  one or more rear axles and wheels, and
  tipping means operable to tip the bin;
the tip trailer being characterised by large transverse trusses located under the floor between the front and rear axles and configured to transfer a downward force exerted by a load in the bin to outer edges of the bin.

By transferring the load to an outer edge of the bin, the large transverse trusses permit the weight to be transferred by the side walls or by vertical struts to overhead beams.

According to a third aspect, the present invention provides a tip trailer including:
  a bin having a floor, a front wall, side walls and a plurality of struts extending from the floor to substantially an upper extremity of the side walls;
  one or more rear axles and wheels; and
  tipping means operable to lift a front end of the bin;
the tip trailer being characterised in that at least one of the struts is positioned internally of the sidewalls and is adapted to divert material around the strut when the bin is tipped.

This arrangement provides a significant increase in the volume of the bin, as the 'skin' of the bin is situated at the outer edge of the bin, rather than internally relative to the vertical struts.

In the past it has been seen to be impractical to locate the vertical struts inwardly of the sidewalls of the bin, for instance due to material catching behind the vertical struts when the bin is tipped. However, it has now been realised that the volume of the bin can be significantly increased without creating this problem by providing the vertical struts internally to the sidewalls and configuring the vertical struts to divert material around the strut when the bin is tipped.

Preferably, in order to divert material around the vertical struts when the bin is tipped, each strut has a forward surface angled away from an adjacent sidewall. For example, each strut may have a triangular cross sectional shape, with the forward surface of the triangular strut forming an obtuse angle with the adjacent sidewall.

According to a fourth aspect, the present invention provides a tip trailer including:
  a bin having a floor, a front wall, side walls and a plurality of struts extending from the floor to substantially an upper extremity of the side walls;
  one or more rear axles and wheels which support the floor at a height above ground; and
  tipping means operable to lift a front end of the bin;
the tip trailer being characterised by a, preferably low profile, drawbar hingedly connected at a front extremity to a turnplate-hitch and hingedly connected at a rear extremity of the drawbar to the bin, the low profile drawbar being situated at least partially above the height of the floor.

The low profile drawbar being situated at least partially above the height of the floor reduces the portion of the low profile drawbar situated below the height of the floor, permitting the bin to be mounted such that the floor of the bin is located close to the top of the wheels, thereby lowering a center of gravity of the tip trailer and increasing stability.

The low profile drawbar should be of sufficient length relative to a tip height of the bin to permit tipping of the bin. The low profile drawbar may be hingedly connected to the turnplate-hitch and to the bin by known pin and sleeve arrangements.

The low profile drawbar is preferably effected by primary beams passing along an outer edge of the floor, and preferably situated at least partially above a height of the floor. This arrangement may be assisted by sidewalls which are angled such that, close to the floor, the side wall extends inwardly to meet the floor a distance from the edge of the bin. In such embodiments the floor is not as wide as the bin, but is of sufficient width to meet the angled portion of the sidewalls, thereby forming a longitudinally mitred corner where the floor and the sidewall meet. The low profile drawbar may then be adapted to fit around the mitred corner, and even to extend above the mitre, outside the bin wall. This reduces the portion of the low profile drawbar situated below a height of the floor, and permits the bin to be mounted such that the floor of the bin is located close to the top of the wheels.

The low profile drawbar preferably includes a number of secondary struts situated below the floor and extending between the primary beams. The secondary struts are preferably configured so as to provide stability and rigidity to the low profile drawbar. The secondary struts preferably have a small vertical dimension to permit the floor of the bin to be mounted close to the top of the wheels.

A turnplate and turnplate-hitch are preferably provided and preferably are of low profile, that is, having a small vertical dimension to permit the mounting of the bin such that the floor of the bin is close to the top of the wheels. The turnplate-hitch acts to transfer force between the turnplate and the low profile drawbar. Preferably, the turnplate-hitch transfers force between the turnplate and primary beams of the low profile drawbar.

Embodiments of the present invention may include the features of one or more of the above aspects of the invention, as will be recognised by one skilled in the art. For instance, rear vertical beams supporting the overhead beam of the first aspect of the invention may be located inwardly of each sidewall and adapted to divert material around the beam, in accordance with the third aspect of the invention. Further, large transverse trusses may be provided, in which case the low profile drawbar preferably extends around a transverse extremity of each truss.

The tip trailer of any one of the above aspects of the invention may further include a tailgate extending across a rear end of the bin, attached by hinges so as to swing open when the bin is tipped to permit material to pass out of the bin, and to swing closed when the bin is not lifted to prevent material from exiting the bin. The tailgate may further include locking means to prevent unwanted movement of the tailgate. The movement of the tailgate may be controlled by one or more hydraulic rams.

The tip trailer of the present invention may include one or more front axles and wheels.

According to a fifth aspect, the present invention provides a side tipper including:
- a bin having a floor, a front wall, a rear wall, one or more side walls and a plurality of struts extending from the floor to substantially an upper extremity of the walls;
- one or more rear axles and wheels; and
- tipping means operable to lift a side of the bin;

wherein overhead beams for bearing a load of the bin are located substantially at an upper extremity of each side of the bin and extend substantially along a length of the bin, and wherein the floor is suspended from the overhead beams.

The floor is preferably suspended from the overhead beams by one or more of the walls and/or the struts. The side tipper may also include one or more front axles and wheels.

The side tipper of the fifth aspect of the invention preferably includes a plurality of gates along a side of the bin. A plurality of gates may be desirable in cases where a storage vessel has a relatively narrow opening, such as a grain silo configured for a conventional rear end tip trailer. In such cases, a single gate may be opened at any one time in order to direct a portion of the load into the opening without spillage, after which the side tipper may be moved relative to the opening such that another gate may be opened to direct a further portion of the load into the narrow opening of the silo.

Preferred embodiments of the fifth aspect of the invention further include transverse trusses located under the floor between the front and rear axles. The transverse trusses are preferably configured to transfer a downward force exerted by a load in the bin to outer edges of the bin. As such transverse trusses are located between the front and rear axles, they may extend significantly below a height of the top of the wheels.

The overhead beams of the fifth aspect of the invention also overcome or ameliorate a significant problem in prior art side tippers, which can undergo significant twist or torque when the bin is tipped. This twist is often due to an uneven load distribution in the bin or to an uneven lifting force provided by two or more hydraulic tipping rams. Complex proportioning of the forces exerted by the rams is often the only solution to this problem. The overhead beams of the present invention significantly strengthen and stiffen the bin, which enables simple and relatively inexpensive hydraulics to be used. In embodiments where such are provided, large transverse trusses also assist in stiffening the bin and preventing twist in the bin during tipping.

The side tipper of the fifth aspect of the invention may further include a rear turnplate, such that one or more additional trailers may be connected in a B-double or road train arrangement. Such embodiments are particularly advantageous as a plurality of side tipper trailers may be loaded, transported and unloaded without the need for unhitching the trailers.

BRIEF DESCRIPTION OF DRAWINGS

Examples of the invention will now be described with reference to the accompanying drawings in which.

MODES FOR CARRYING OUT THE INVENTION

Figure 1A:
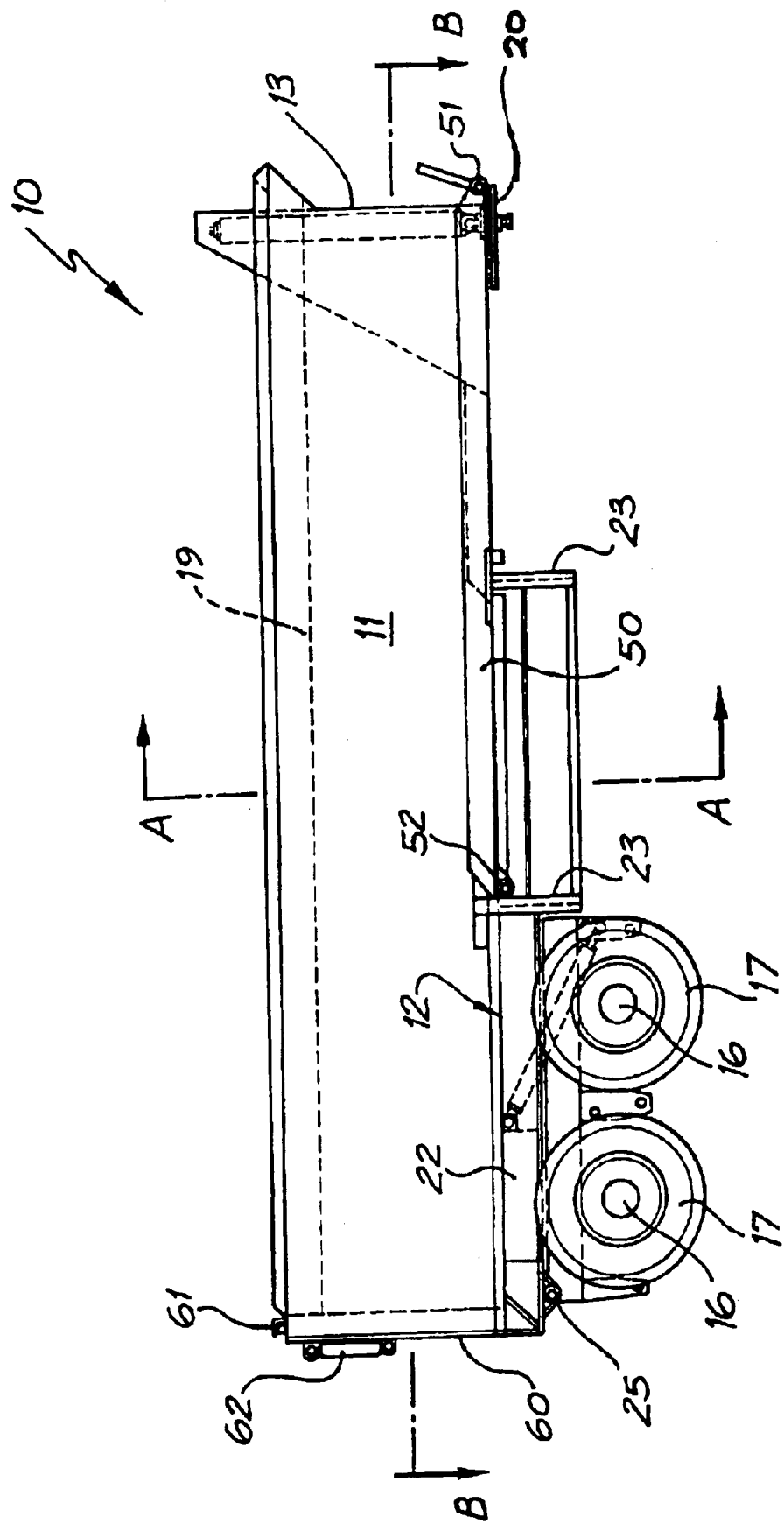
FIGS. 1a and 1b show a portion of a tip trailer in accordance with the present invention in a travel position and in a tipped position.
Figure 1B:
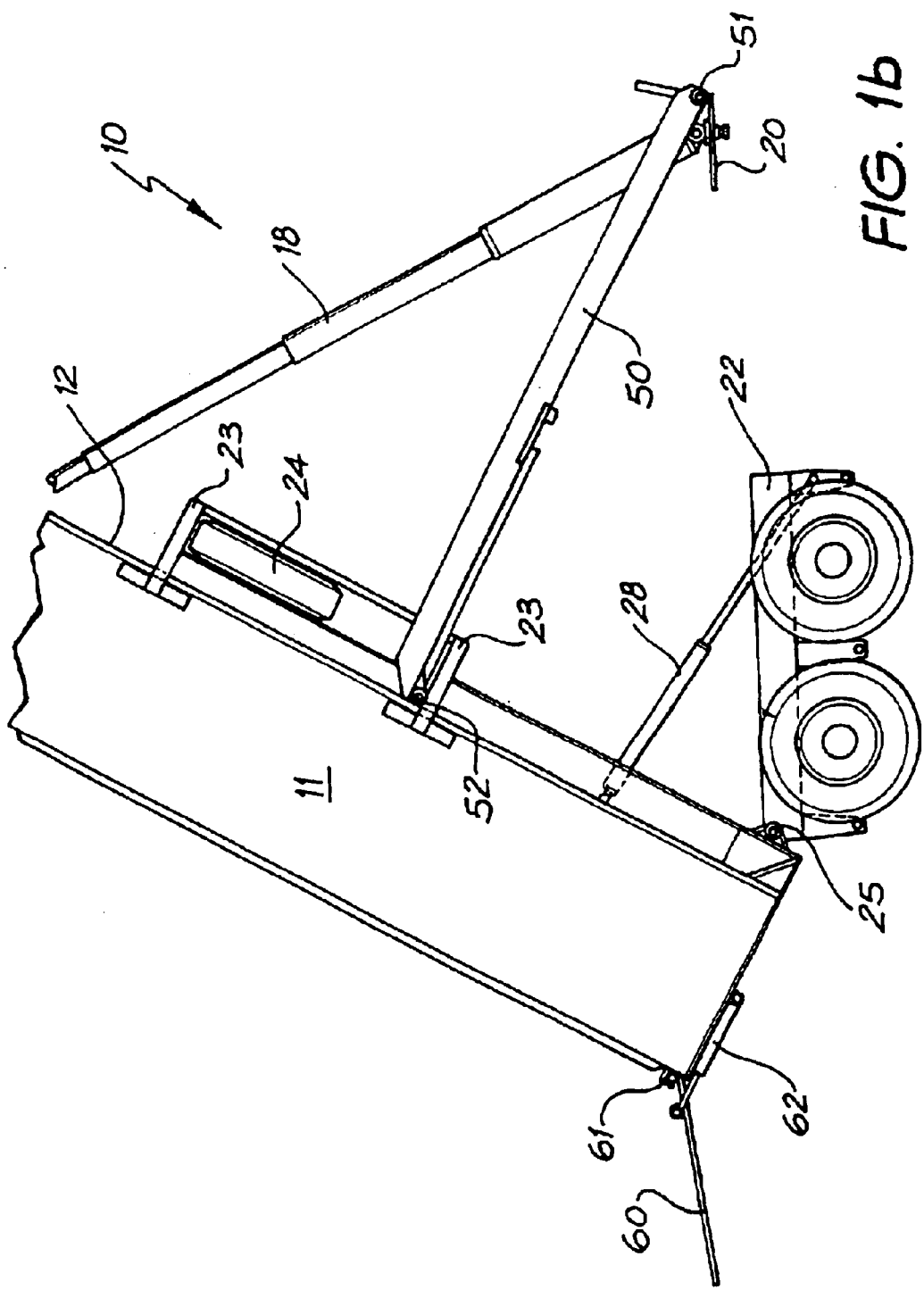

FIGS. 1a and 1b show a portion of a tip trailer 10 in accordance with the present invention. FIG. 1a shows a bin 11 of the tip trailer 10 in a travel position, and FIG. 1b shows a bin 11 of the tip trailer 10 in a tipped position. In accordance with the first aspect of the invention, the bin 11 of the tip trailer 10 has a floor 12, a front wall 13, two side walls and a plurality of struts 21 (refer to FIG. 2b) extending from the floor 12 to the upper extremity of the side walls. The tip trailer 10 further includes two front axles (not shown) and corresponding front wheels (not shown) and two rear axles 16 and corresponding rear wheels 17. Tipping means 18 are operable to tip the bin 11, as shown in FIG. 1b. In the embodiment of the invention shown in FIGS. 1a and 1b, the tipping means 18 is a hydraulic ram. The tip trailer further includes overhead beams 19 which are located substantially at an upper extremity of each side wall of the bin 11, and which extend substantially along a length of the bin 11, the floor 12 being suspended from the overhead beams 19 by the walls. The overhead beams 19 act to support some or all of the load in the bin 11, which permits the absence of a chassis between the turnplate 20 and the front wheels, which enables the floor 12 of the bin 11 to be situated significantly closer to the front wheels and rear wheels 17, than in prior art tip trailers, which provides a low center of gravity and improved stability.

Figure 2A:
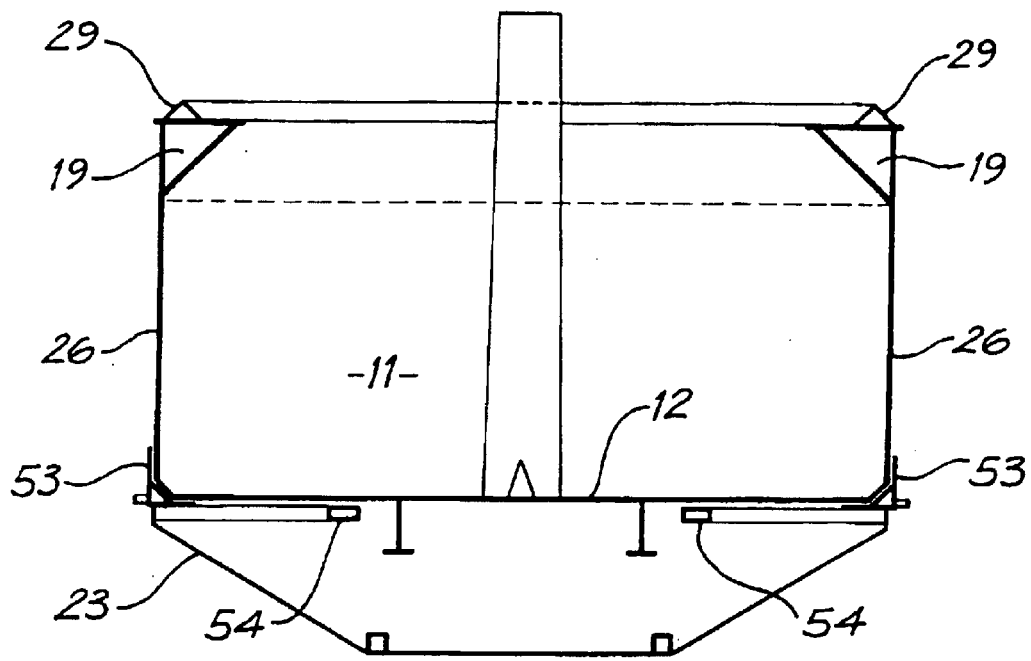
FIGS. 2a and 2b show sectional end views of different portions of the bin of the tip trailer of FIG. 1.
Figure 2B:
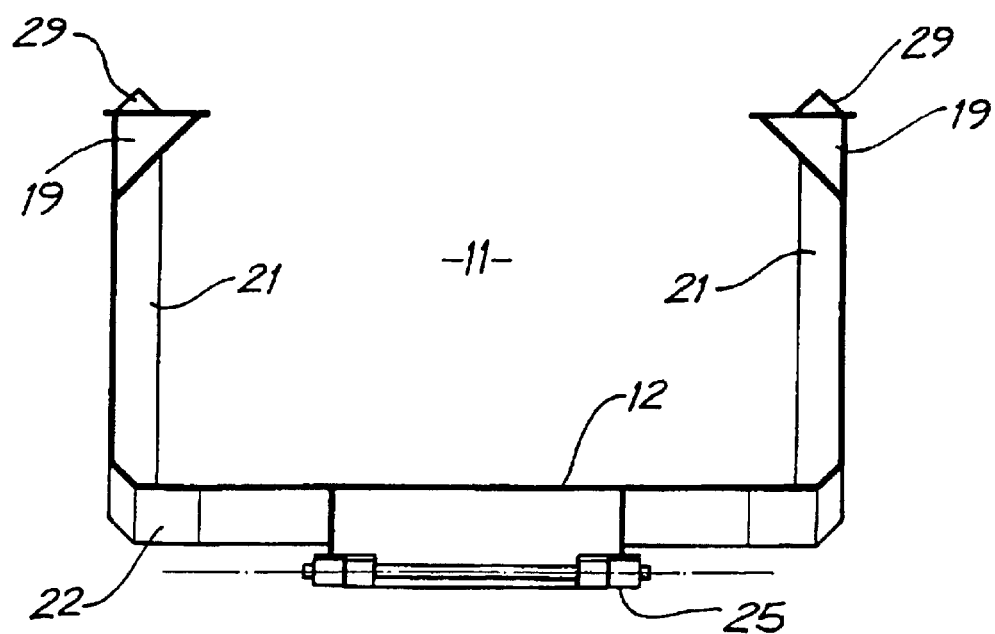

FIGS. 2a and 2b show sectional end views of the bin of the tip trailer of FIG. 1. As can be seen in FIG. 2b, the overhead beams 19 are supported by the front wall and rear vertical struts 21, which are located proximate to the rear axles 16. The hydraulic ram 18 is operable to lift a front end of the bin 11 and supports the front end of the overhead beams 19.

The present embodiment of the invention also includes a half chassis 22 mounted on the rear axles 16. As can be seen, the half chassis 22 does not extend significantly forward of the rear wheels. By enabling the removal of any chassis between the front wheels and the bin 11, the present invention provides a significant advantage over known tip trailers. The rear half chassis 22 in the present embodiment is advantageous over a conventional type chassis, as the rear axles may have underslung suspension, permitting the half chassis to have a low profile mounting. Such suspension is impractical at the front axles due to the presence of elements such as the turnplate.

The tip trailer 10 further includes large transverse trusses 23 located under the floor 12 of the bin 11 between the front axles 14 and the rear axles 16. As the half chassis 22 does not extend forward to a position of the large transverse trusses 23, it is possible for the transverse trusses 23 to extend well below a height of the top of the wheels 17, 15. The use of transverse trusses is precluded by prior art tip trailers, as the heavy chassis of prior art tip trailers extends along the length of the bin underneath the floor, and occupies the space in which the transverse beams would be placed. The transverse trusses 23 are configured to transfer a downward force exerted by a load in the bin 11 to outer edges of the bin 11. As shown in FIG. 2a, which is a cross-sectional view A—A of FIG. 1a, the transverse trusses transfer the weight of the load. Furthermore, the transverse trusses may be configured to provide a convenient storage place, for example to store a wheel 24, as shown in FIG. 1b.

As shown in FIGS. 1a and 1b, bin 11 is mounted to the rear axles by a pin and sleeve arrangement 25 on the half chassis 22. Tipping of the bin causes rotation of the pin in the sleeve, and the action of hydraulic ram 18 is assisted by hydraulic ram 28 which could be absent in other embodiments of the invention or, alternatively, implemented by other tipping means such as an airbag. As shown in FIG. 1a, turnplate 20 is of low profile having a small vertical dimension.

Figure 3:
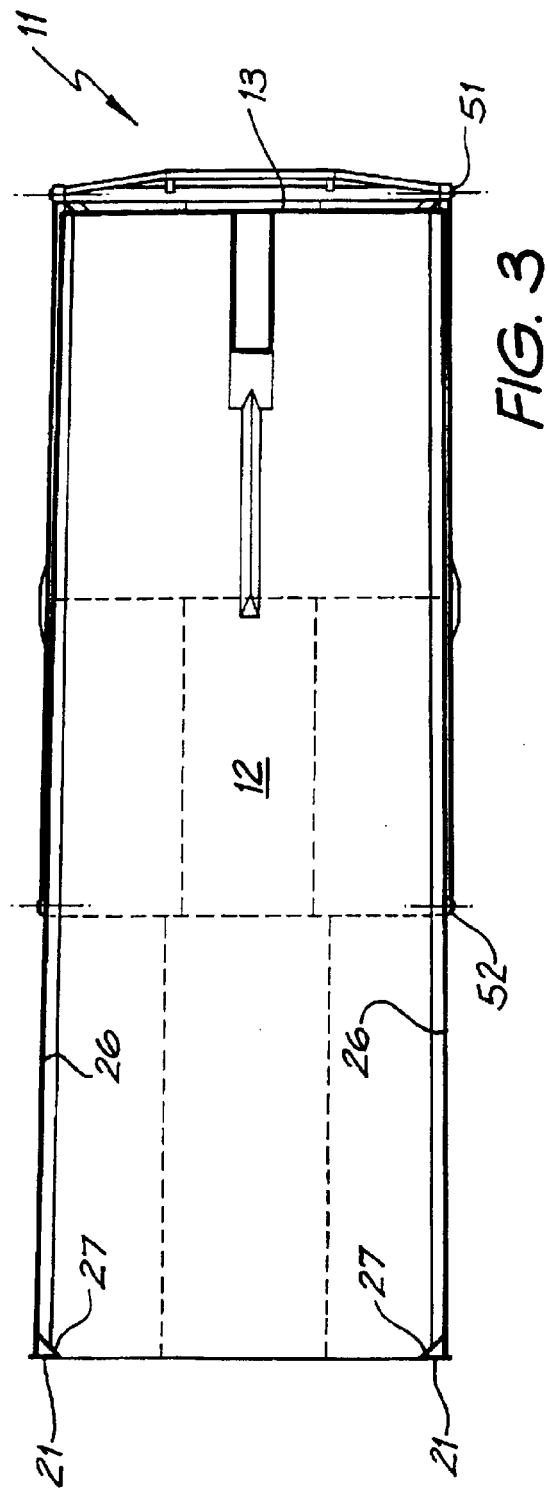
FIG. 3 shows a sectional plan view of the bin of the tip trailer of FIG. 1.
Figure 4:
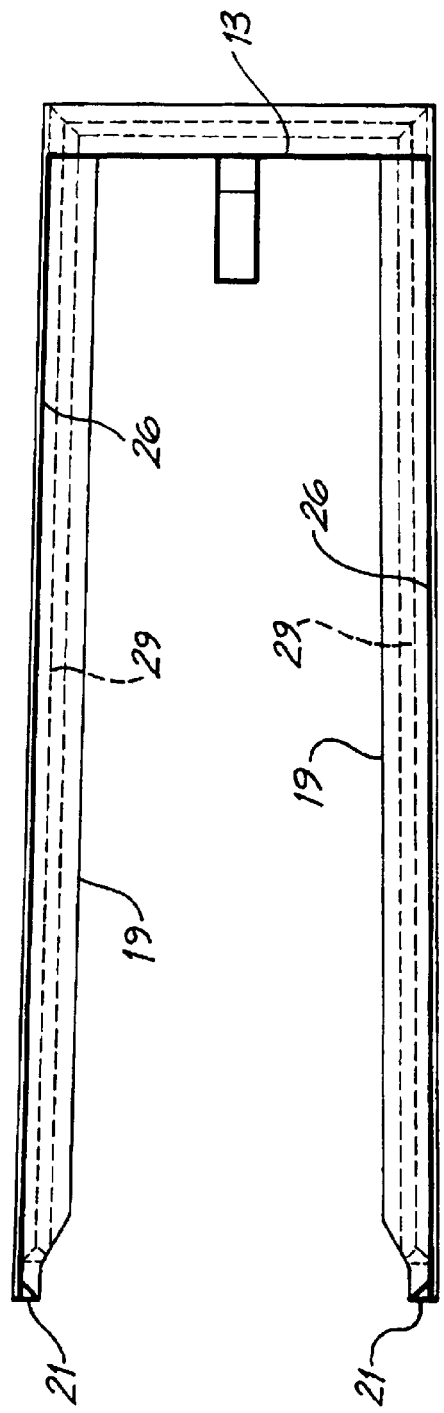
FIG. 4 shows an inverted sectional plan view of the bin of the tip trailer of FIG. 1.

Turning to FIGS. 2a and 2b, it is noted that the bin 11 further includes secondary overhead beams 29 above overhead beams 19. Secondary overhead beams 29 provide further structural strength and tend to direct spill either into the bin 11 or off the side of the bin 11. Furthermore, the vertical struts 21 are situated internally of the side walls 26, each strut 21 being adapted to divert material around the vertical strut 21 when the bin 11 is tipped. FIG. 3, which shows a sectional plan view of the bin 11 of the tip trailer 10, indicated by section B—B in FIG. 1a, shows the cross-sectional shape of the vertical struts 21. Each strut 21 has a forward surface 27 which is angled away from the adjacent side wall 26, so as to form an obtuse angle with each side wall 26. Positioning the struts 21 internally relative to the side walls 26 provides a significant increase in the volume of the bin 11, as the 'skin' of the bin 11 is situated at the outer edge of the bin 11, rather than internally relative to the vertical struts 21. Providing the struts adapted to divert material around the strut when the bin is tipped eliminates, or significantly reduces, the chance of material catching behind the vertical struts 21 when the bin 11 is tipped.

In accordance with the preferred embodiment of the present invention, the tip trailer 10 includes a low profile drawbar 50. The low profile drawbar 50 is hingedly connected at a front extremity to a turnplate-hitch (not shown) by a known pin and sleeve arrangement 51. The low profile drawbar is hingedly connected at a rear extremity of the drawbar to the bin 11 by a known pin and sleeve arrangement 52. As illustrated in FIG. 1b, the low profile drawbar 50 is of sufficient length relative to a tip height of the bin 11 to permit tipping of the bin 11 by the hydraulic ram 18.

Figure 5A:
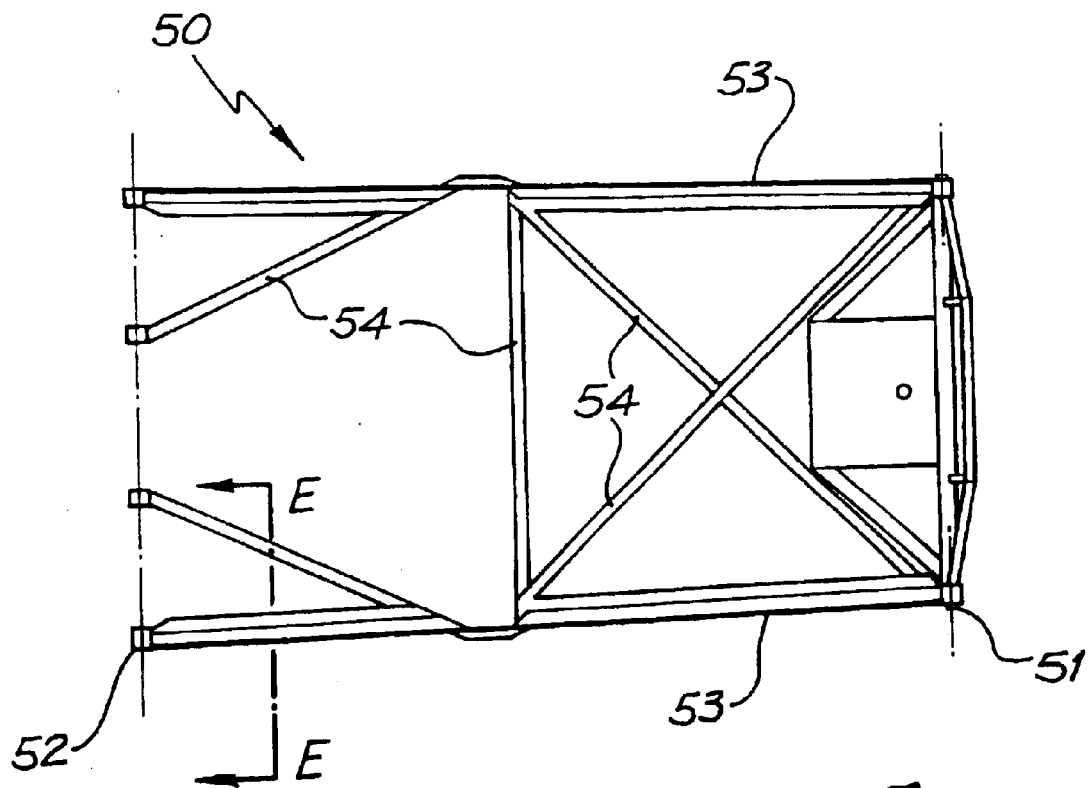
FIGS. 5a and 5b show a low profile drawbar in accordance with the invention.
Figure 5B:
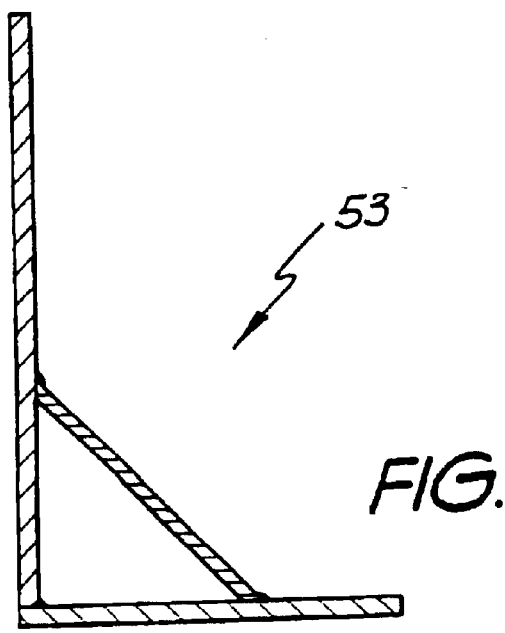
Figure 6:
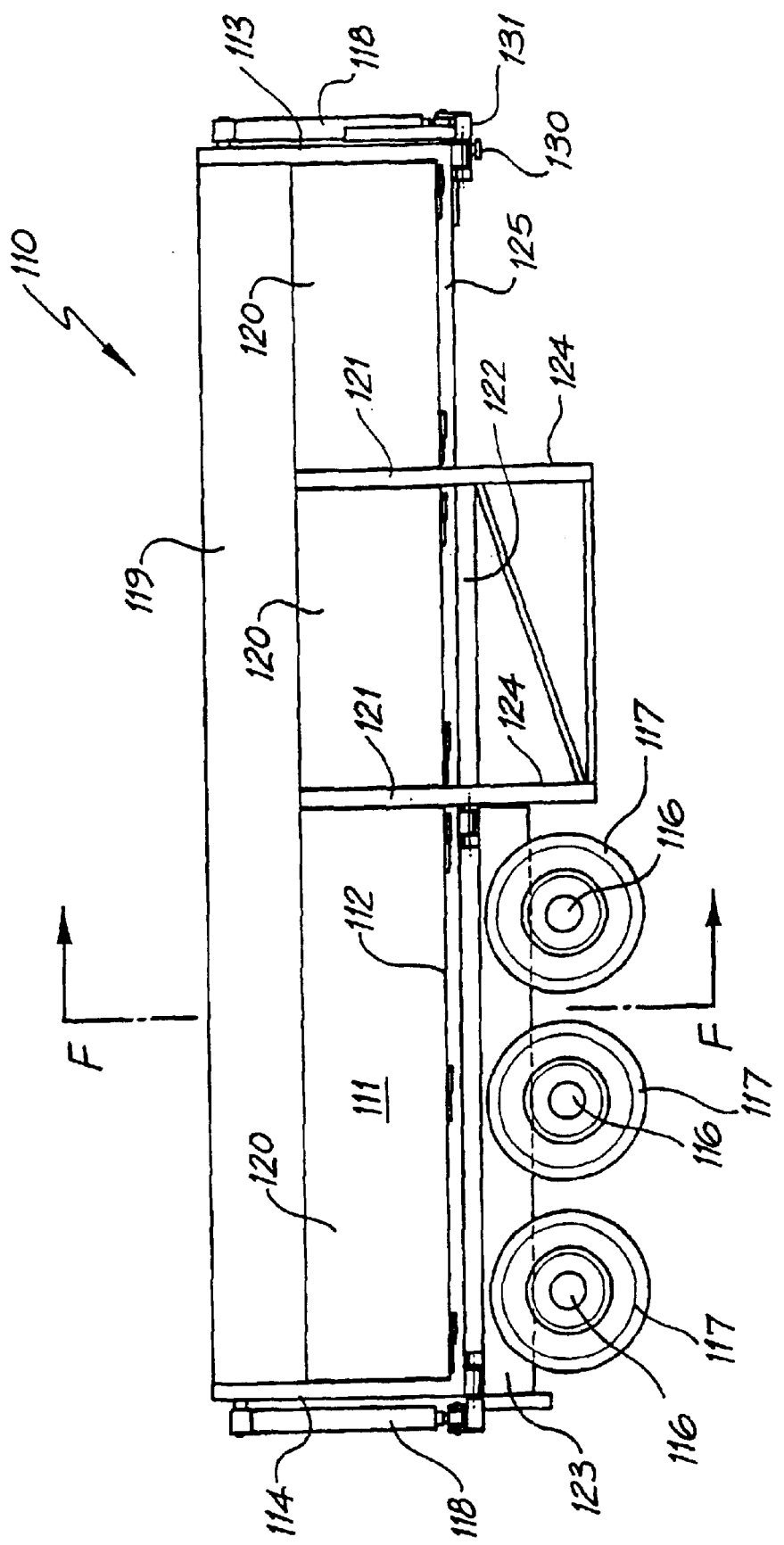
FIG. 6 shows a side tipper in accordance with the invention.
Figure 7:
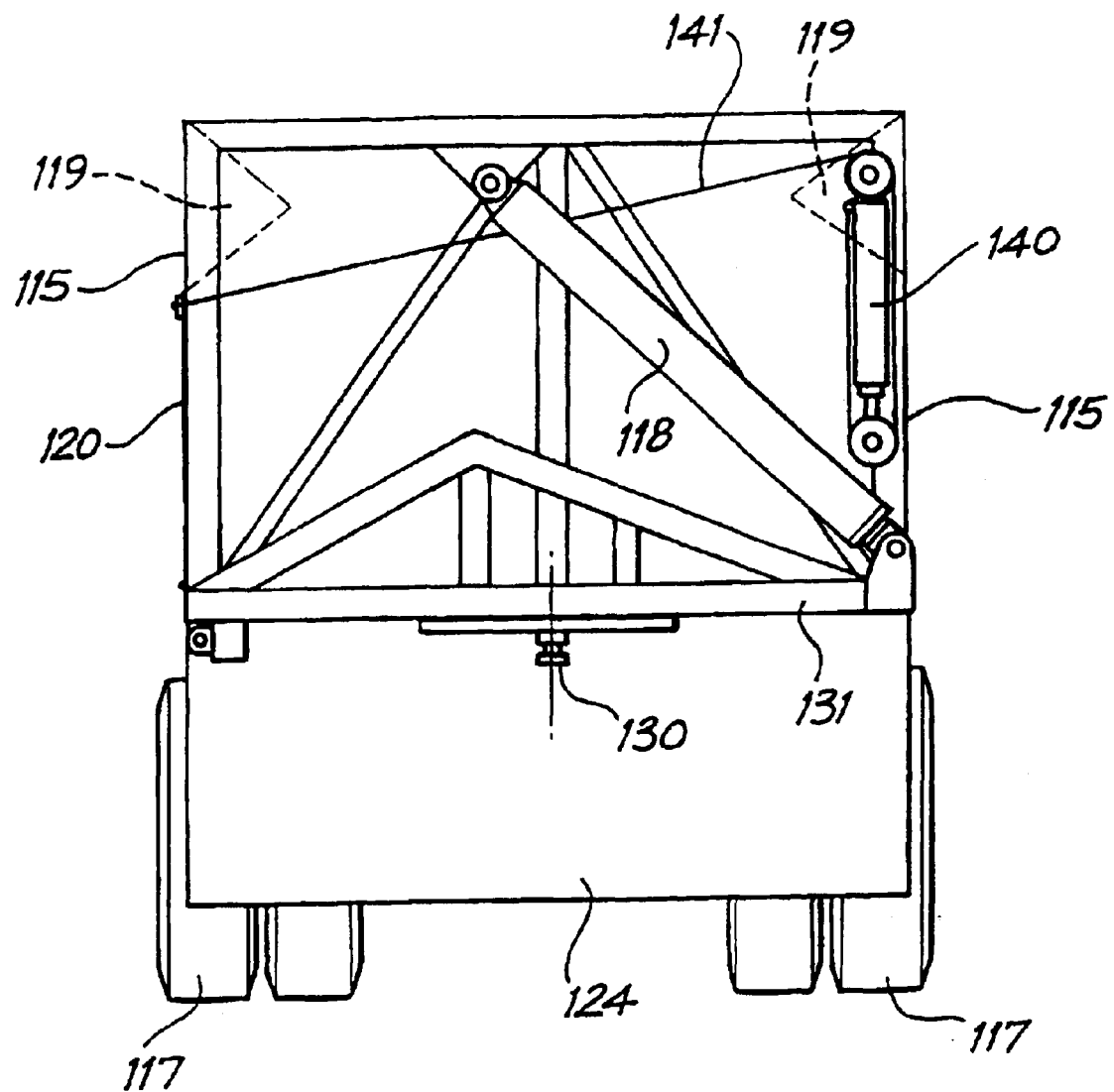
FIG. 7 is a sectional front view of the side tipper of FIG. 6 taken along line F—F of FIG. 6.
Figure 8B:
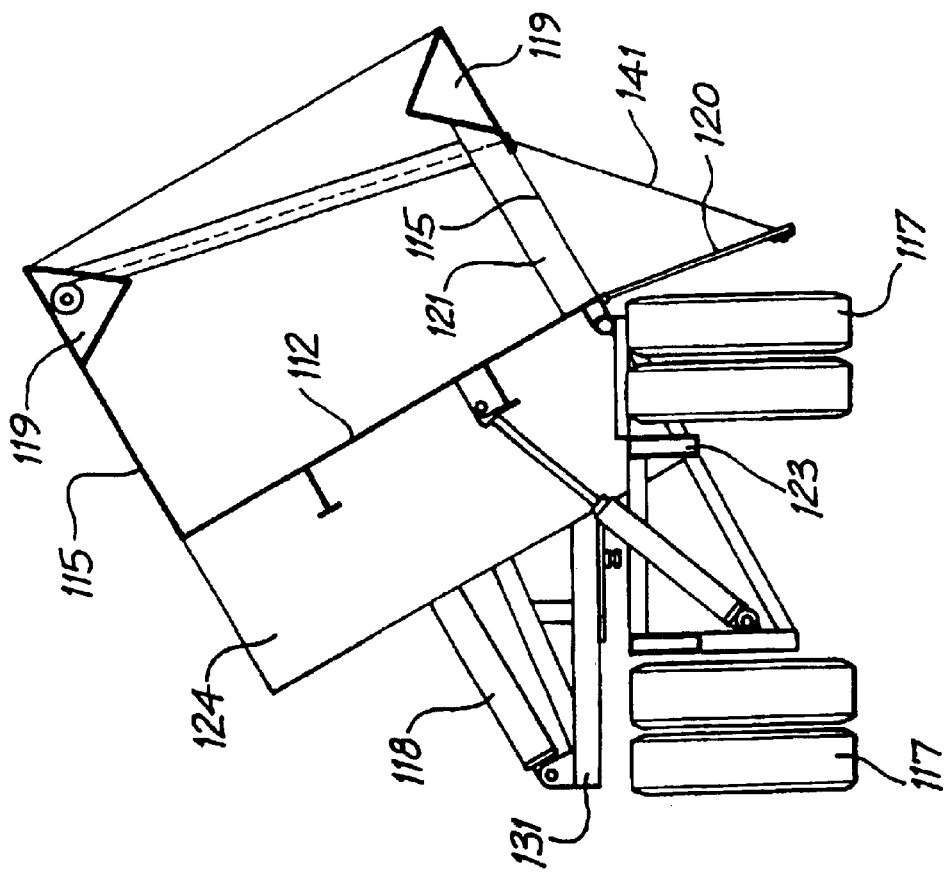
FIGS. 8a and 8b are cross sectional rear views of the side tipper of FIG. 6 in a drive position and a tipped position.
Figure 8A:
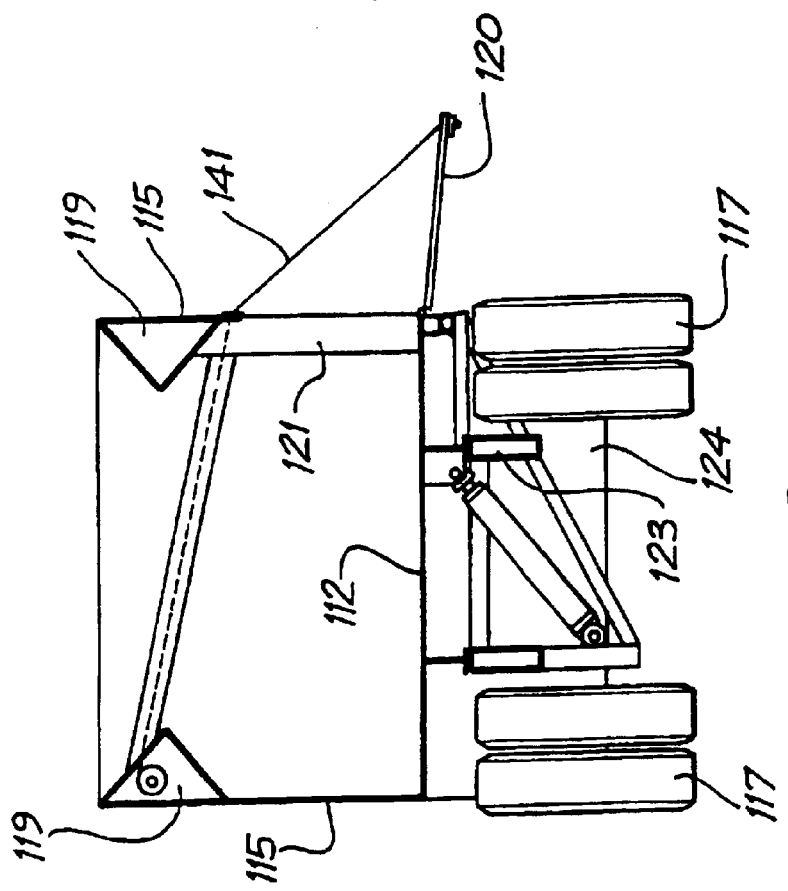

FIGS. 5a and 5b show a low profile drawbar in accordance with the invention. Features of the drawbar 50 are also revealed in FIG. 2a. The low profile drawbar 50 is effected by primary beams 53 passing along an outer edge of the floor 12. As shown in FIG. 2a, the primary beams 53 are situated at least partially above a height of the floor 12. In the present embodiment, the side walls 26 are angled such that, close to the floor 12, the side walls 26 extend inwardly to meet the floor 12 a distance from the edge of the bin 11, thereby forming a longitudinally mitred corner where the floor 12 and the side walls 26 meet. The primary beams 53 of the low profile drawbar 50 are adapted to fit around the mitred corner, and to extend above the mitre outside the bin wall 26. As can be seen in FIG. 2a, this reduces the portion of the low profile drawbar 50 situated below a height of the floor 12, permitting the bin 11 to be mounted such that the floor 12 of the bin 11 is located close to the top of the wheels 15, 17. The low profile drawbar 50 further includes a number of secondary struts 54 situated below the floor 12 and extending from or between the primary beams 53, which are configured so as to provide stability and rigidity to the low profile drawbar 50. As shown in FIG. 2a, the secondary struts 54 have a small vertical dimension to permit the floor 12 of the bin 11 to be mounted close to the top of the wheels 15, 17. FIG. 5b illustrates cross-section E-E of the primary beam 53 shown in FIG. 5a. The low profile drawbar 50 is configured to accommodate the transverse trusses 23 by passing around the outside of the trusses 23.

The tip trailer of the present invention further includes a tail gate 60 extending across a rear end of the bin 11 attached by hinges 61 so as to swing open when the bin 11 is tipped, to permit material to pass out of the bin, and to swing closed when the bin 11 is not tipped to prevent material from exiting the bin 11. The movement of the tail gate 60 in the present embodiment is controlled by a hydraulic ram 62, which serves to lift the tail gate 60 when the bin 11 is tipped by the hydraulic ram 18, When the bin 11 is not in a tipped position, as shown in FIG. 1a, the hydraulic ram 62 serves to secure the tail gate 60 in a closed position, FIGS. 6, 7, 8a and 8b illustrate a second embodiment of a side tipper of the present invention. The bin 111 of the side tipper 110 has a floor 112, a front wall 113, a rear wall 114 and side walls 115. The side tipper 110 includes a plurality of axles 116 and respective wheels 117. Tipping means (hydraulic rams 118) are operable to tip the bin. The front and rear walls 113, 114, and vertical struts 121 support overhead beams 119 which are located substantially at an upper extremity of each side of the bin 111 and extend substantially along a length of the bin 111, wherein the floor 112 is suspended from the overhead beams 119. A plurality of gates 120 are situated along a side of the bin 111. Vertical struts 121 are located between gates 120.

The side tipper 110 includes a bin chassis 122, which tips with the bin 111 when the bin 111 is tipped. The side tipper 110 further includes a sub-chassis 123, which is secured to the axles 116. Transverse trusses 124 are situated beneath the floor 112 of the bin 111 to transfer a weight of a load in the bin 111 via the vertical struts 121, the sidewalls 115 and the front and rear walls 113, 114 to the overhead beams 119. The front end of the bin is supported by a turnplate 130 and a turnplate cradle 131 supporting the hydraulic ram 118.

The overhead beams 119 of the side tipper 110 also overcome or ameliorate a significant problem in prior art side tippers, which can undergo significant twist or torque when the bin is tipped. The overhead beams 119 of the present invention significantly strengthen and stiffen the bin 111, which enables simple and relatively inexpensive hydraulics 118 to be used. The transverse trusses 124 also assist in stiffening the bin and preventing twist and, in the embodiment shown in FIG. 6, a small beam 125 further assists in this regard. The side tipper illustrated in FIGS. 6, 7, 8a and 8b further includes a novel system to control movement of the gates 120, including a hydraulic ram 140 and cables and/or chains or the like 141. In accordance with the present invention, the overhead beams 119 are substantially hollow, enabling the cables 141 to be conveniently situated inside the overhead beams 119 on the side of the bin 111 opposite the gates 120.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A side tip trailer comprising:
   a bin having a floor, a front wall, side walls and a plurality of struts extending from the floor to substantially an upper extremity of the side walls;
   one or more rear axles and wheels; and
   tipping means operable to tip the bin;
   wherein overhead beams for bearing the bin and a load of the bin are located substantially at an upper extremity of each side wall and extend substantially along a length of the bin; and
   wherein the floor is suspended from the overhead beams, wherein the bin includes a chassis situated below the floor, wherein the chassis does not extend significantly forward of a rear half of the bin.

2. The side tip trailer of claim 1 wherein the floor is suspended from the overhead beams by the struts.

3. The side tip trailer of claim 1 wherein the overhead beams are supported by rear struts located proximate the rear axle, and by the front wall.

4. The tip trailer of claim 1 wherein the floor is suspended from the overhead beams by the walls.

5. The side tip trailer of claim 1 wherein the floor of the bin is situated close to the rear axle.

6. The tip trailer of claim 1 wherein the overhead beams are supported by rear struts located proximate the rear axle, and by struts proximate the front wall.

7. The side tip trailer of claim 1 wherein the tipping means comprises one or more hydraulic rains.

8. The side tip trailer of claim 1 further comprising large transverse trusses located under the floor between the rear axle and a front of the bin and configured to transfer a downward force exerted by a load in the bin to outer edges of the bin.

9. The side tip trailer of claim 1 wherein large transverse trusses are located beneath the floor forward of the rear axle, and are configured to transfer a downward force exerted a load in the bin to outer edges of the bin.

10. A side tipper comprising:
    a bin having a floor, a front wall, a rear wall, one or more side walls and a plurality of struts extending from the floor to substantially an upper extremity of the walls;
    one or more rear axles and wheels; and
    tipping means operable to lift a side of the bin;
    wherein overhead beams for bearing the bin and a load of the bin are located substantially at an upper extremity of each side wall of the bin and extend substantially along a length of the bin, and wherein the improvement comprises the suspension of the floor from the overhead beams so as to permit the absence of a chassis beneath the floor for supporting the floor of the bin.

11. The side tipper of claim 10 wherein the floor is suspended from the overhead beams by one or more of the walls.

12. The side tipper of claim 10 further comprising a plurality of gates along a side of the bin.

13. The side tipper of claim 10 further comprising transverse trusses located under the floor between the front wall and the rear axle and configured to transfer a downward force exerted by a load in the bin to outer edges of the bin.

14. The side tipper of claim 10 wherein the floor is suspended from the overhead beams by the struts.

15. A tip trailer comprising:
    a bin having a floor, a front wall, side walls and a plurality of struts extending from the floor to substantially an upper extremity of the side walls;
    one or more rear axles and wheels; and
    tipping means operable to tip the bin;
    wherein overhead beams for bearing the bin and a load of the bin are located substantially at an upper extremity of each side wall and extend substantially along a length of the bin;
    wherein the floor is suspended from the overhead beams; and
    wherein large transverse trusses are located beneath the floor forward of the rear axle, and are configured to transfer a downward force exerted by a load in the bin and to outer edges of the bin.

16. A tip trailer comprising:
    a bin having a floor, a front wall, side walls and a plurality of struts extending from the floor to substantially an upper extremity of the side walls;
    one or more rear axles and wheels;
    tipping means operable to tip the bin; and
    large transverse trusses located under the floor between the rear axle and a front of the bin and configured to transfer a downward force exerted by a load in the bin to outer edges of the bin;
    wherein overhead beams for bearing the bin and a load of the bin are located substantially at an upper extremity of each side wall and extend substantially along a length of the bin; and
    wherein the floor is suspended from the overhead beams.

17. A side tipper comprising:
    a bin having a floor, a front wall, a rear wall, one or more side walls and a plurality of struts extending from the floor to substantially an upper extremity of the walls;
    one or more rear axles and wheels;
    tipping means operable to lift a side of the bin; and
    transverse trusses located under the floor between the front wall and the rear axle and configured to transfer a downward force exerted by a load in the bin to outer edges of the bin;
    wherein overhead beams for bearing the bin and a load of the bin are located substantially at an upper extremity of each side wall of the bin and extend substantially along a length of the bin, and wherein the floor is suspended from the overhead beams.

* * * * *